Patented Nov. 2, 1926.

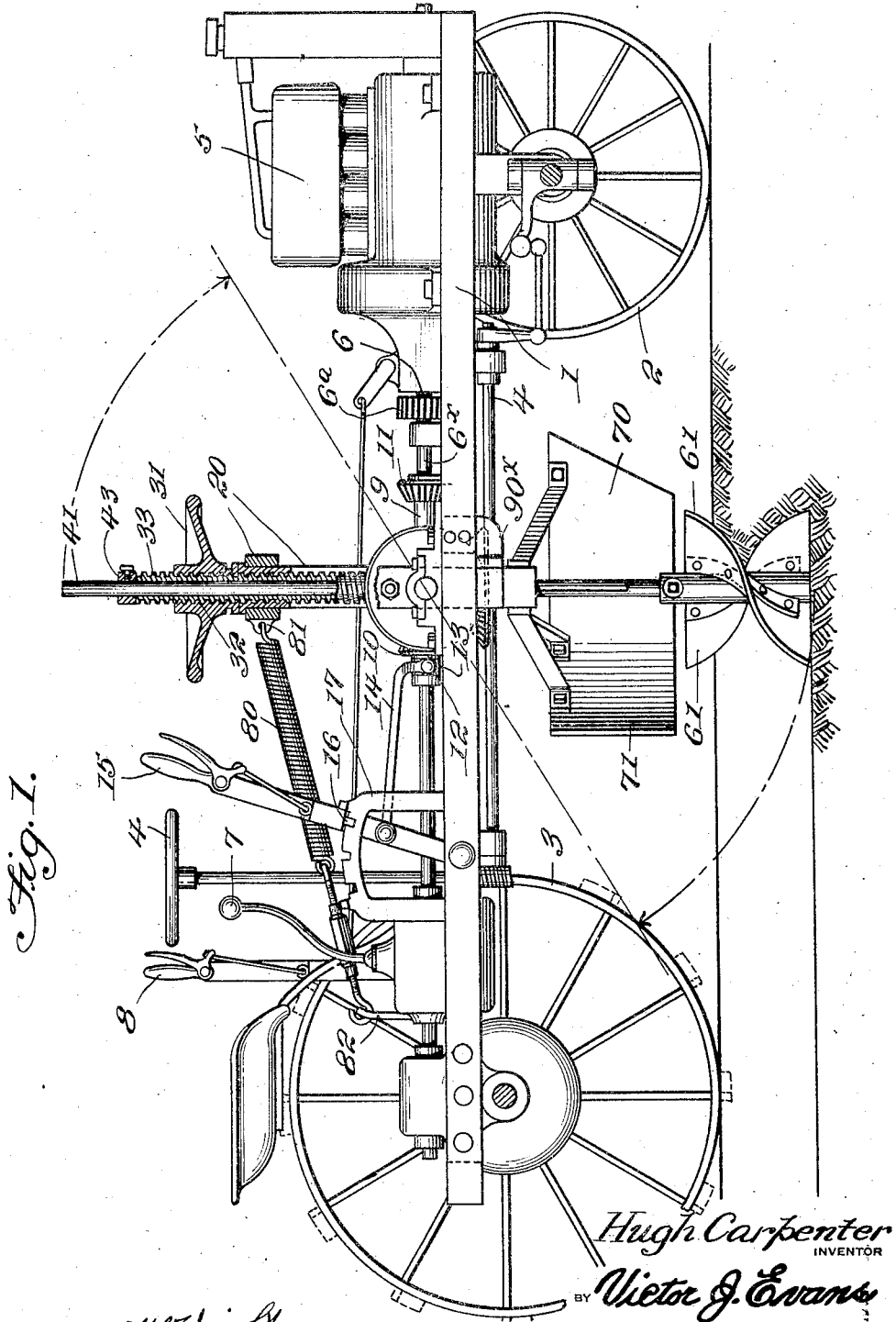

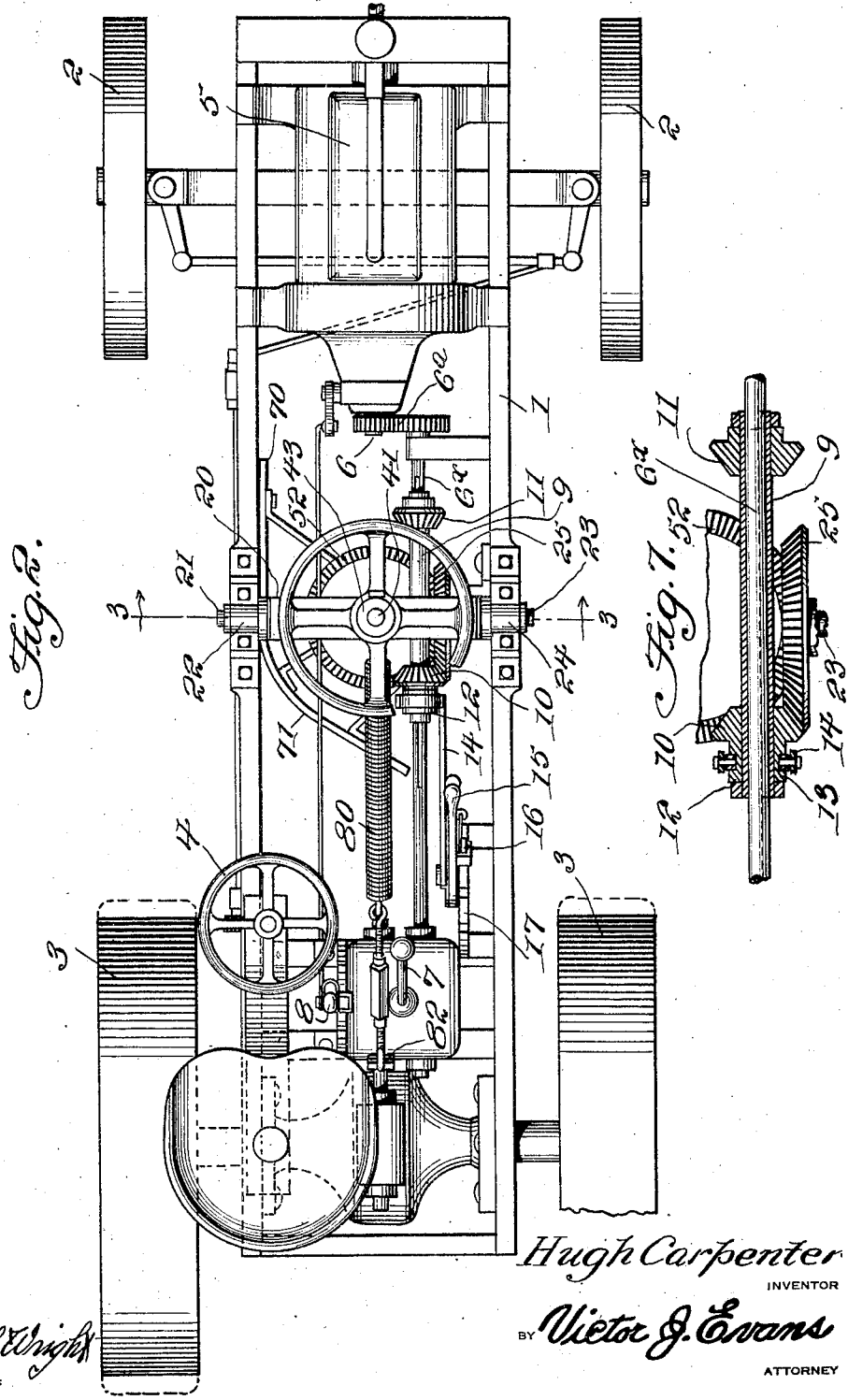

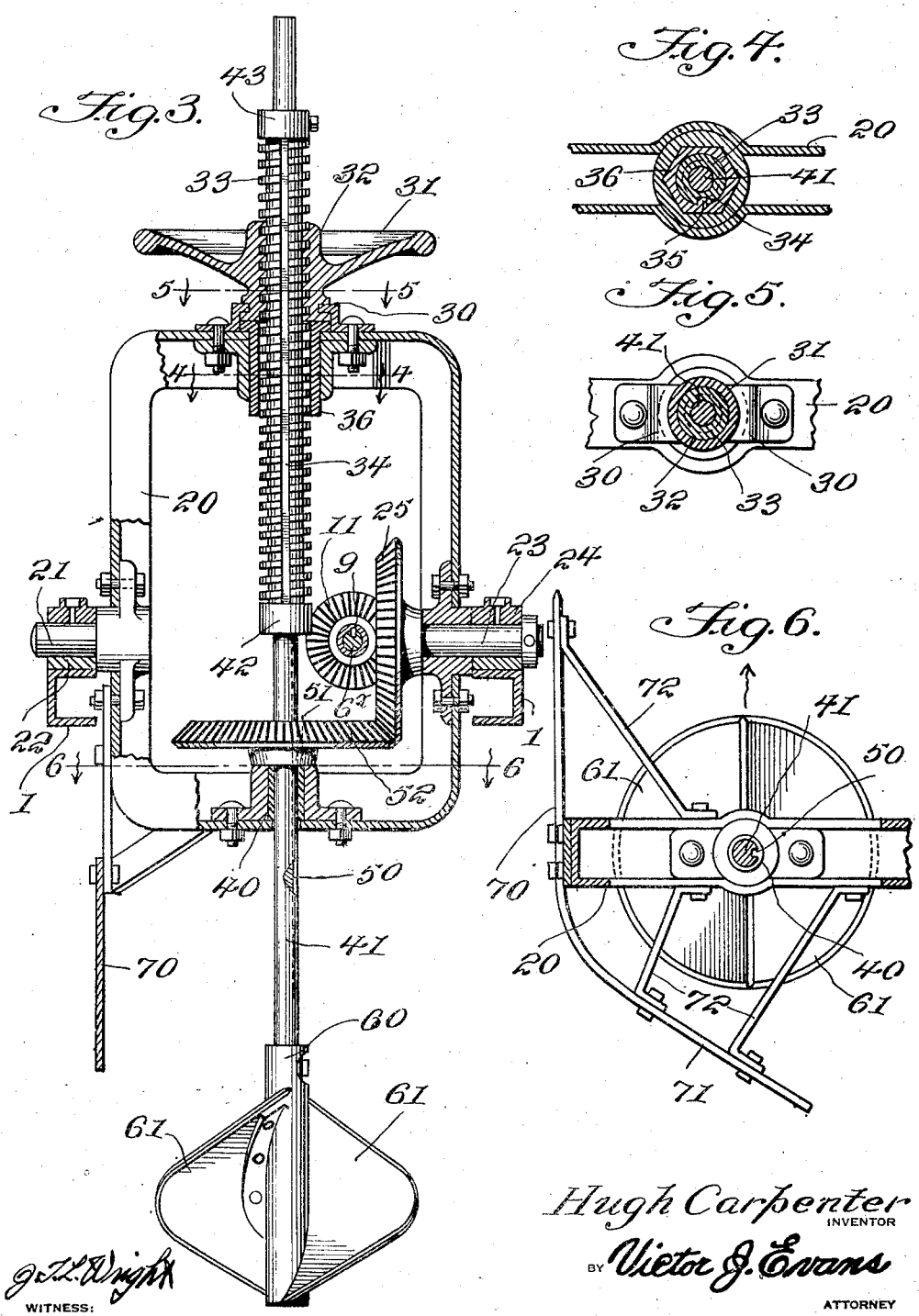

1,605,707

UNITED STATES PATENT OFFICE.

HUGH CARPENTER, OF KNOXVILLE, TENNESSEE.

PLOW APPARATUS.

Application filed November 19, 1924. Serial No. 750,906.

The object of my present invention is the provision of an apparatus designed especially for deep plowing and plowing in hard ground and also adapted to be used to advantage for ditching purposes, and for digging post holes and the like.

To the attainment of the foregoing, the invention consists in the improvement as hereinafter described and definitely claimed.

In the accompanying drawings, forming part of this specification:—

Figure 1 is a view partly in elevation and partly in longitudinal vertical section illustrative of the apparatus constituting the preferred embodiment of my invention.

Figure 2 is a top plan view of the apparatus.

Figure 3 is an enlarged detail vertical cross-section taken in the plane indicated by the line 3—3 of Figure 2.

Figures 4, 5 and 6 are horizontal sections taken in the planes indicated by the lines 4—4, 5—5 and 6—6, respectively, of Figure 3.

Figure 7 is a detail longitudinal vertical section illustrative of a portion of the driving connection as hereinafter explicitly pointed out.

Similar numerals of reference designate corresponding parts in all of the views of the drawings.

I show in Figures 1 and 2 a motor vehicle including a chassis or frame 1, forward wheels 2, rear wheels 3, and appropriate steering mechanism connected with the forward wheels and designated generally by 4, an internal combustion engine 5 having a drive shaft 6, and the usual driving connection between said driving shaft 6 and the rear wheels 3 as well as the usual transmission lever 7 and the usual clutch lever 8 common to motor vehicles.

The motor vehicle may be of the style and construction above outlined or may be of any other construction compatible with the purpose of my invention without involving departure from the scope of my invention as claimed.

In furtherance of my invention I mount on an auxiliary shaft $6^x$, as best shown in Figure 7, a sleeve 9 with bevelled gears 10 and 11 fixed to it near its ends, the said sleeve 9 being appropriately engaged with the shaft $6^x$ so as to turn with said shaft $6^x$ and yet be capable of adjustment in the direction of the length of the shaft $6^x$. The shaft $6^x$ is connected by gearing $6^a$, Figure 2, with the shaft 6. Loosely surrounding a circumferentially grooved rear portion 12 of the sleeve 9 is a collar 13 and to the said collar 13 is connected the forward end of a rod 14 the rear end of which is connected to a hand lever 15, provided with a detent 16 for cooperation with a rack 17 that is fixed on the frame 1 so that the sleeve 9 can be readily adjusted and as readily fixed adjustably in different positions as hereinafter pointed out.

Also in furtherance of my invention, I provide between the side bars of the chassis or frame 1, as best shown in Figure 3, an open frame that is adapted to swing in a longitudinal vertical plane as indicated by dotted lines in Figure 1. The said open and swingable frame is designated by 20, and it is provided at one side with a trunnion 21 journaled in a bearing 22 on the adjacent side bar of the frame 1. At its opposite side the swingable frame is mounted to turn about a shaft 23 that is journaled in a bearing 24 on the opposite side bar of the frame 1 and is equipped at its inner end with a bevelled gear 25. The said bevelled gear 25 is an idler and is designed to be engaged by the gears 10 and 11 alternately.

Arranged above the frame 20 and connected at 30 in swiveled manner to the upper end of said frame 20 is a hand wheel 31, provided with a threaded bore 32. The said threaded bore 32 receives and engages an exteriorly threaded sleeve 33 in which is a longitudinal keyway 34. The said keyway 34 receives a key 35 in a nut 36 that is supported by and held against turning in the upper bar of the frame 20 and hence it will be understood that the sleeve 33 will be held against turning about its axis notwithstanding the fact that it is free to move endwise upwardly or downwardly when the hand wheel 31 is turned. Extending loosely through the sleeve 33 and also extending loosely through an appropriate bearing 40 carried by the lower portion of the frame 20 is a shaft 41 which is provided below the sleeve 33 with an abutment 42 that is fixed to the shaft 41, and is also provided above the sleeve 33 with a collar or other abutment 43. From this it follows that the shaft 41 is free to turn in the sleeve 33 and yet vertical movement of the shaft 41 will attend vertical movement of the sleeve 33. The shaft 41 is provided with a keyway 50, and said keyway 50 receives a key 51 carried by a horizontal bevelled gear 52 that is superposed on the bearing 40 and is meshed with the before mentioned gear 25. Manifestly when the shaft 6 is rotated by an internal combustion engine 5, and the auxiliary shaft 6ˣ is also rotated and one of the gears 10 or 11 is meshed with the gear 25, the shaft 41 will be rotated about its axis.

Carried by and appropriately fixed to the lower portion of the shaft 41 is a hub 60 to which are affixed spiral blades 61 for ground cutting or plowing purposes, the said blades 61 being preferably of steel and being arranged as shown so as to operate after the manner of an auger except that the outer edges of the blades accomplish practically all of the cutting. It will also be noticed that the blades 61 are bevelled to provide the same with sharp cutting edges. The said blades 61 may be and preferably are detachably connected with the hub 60 so that when dull the blades may be removed from the hub to facilitate sharpening of the blades.

Carried by the frame 20 and relatively arranged as shown in Figures 1, 2, 3 and 6 to the blade member described is a fender 70 having an inwardly deflected rear portion 71. The said fender 70 is appropriately fixed to the frame 20 and is adequately braced from the latter as designated by 72. Incident to a traverse of the apparatus the rotating blade member or plow operates to cut the ground and to raise the earth, this because the plow or blade member is driven at considerable speed. By the cooperation of the fender 70 with the blade member or plow 61, the space above the plow or blade member will be constantly full of dirt, and due to the force of gravity and the circular motion of the plow or blade member practically all of such dirt will be caused to fall on the right hand side of the furrow or channel formed by the plow or blade member.

In order to hold the plow or blade member to its work and at the same time allow said plow blade member to give rearwardly so as to ride over projections in its path, I provide a retractile spring 80, Figures 1 and 2, the said spring 80 is appropriately connected at 81 with the upper portion of the frame 20 and is connected preferably in adjustable manner at its rear end with the rear portion of the motor vehicle as designated by 82, in Figure 1. The said spring 80 serves to normally hold the lower portion of the frame 20 against abutments 90ˣ on the side bars of the frame 1, and hence the plow or blade member will be yieldingly held to its work as best shown in Figure 1, the frame 20 by bringing up against the stops 90 serving to prevent the spring 80 from permitting forward movement of the plow beyond the point shown in Figure 1. When, however, the plow or blade member encounters an obstruction in its path, the spring 80 will permit the frame 20 to swing longitudinally so as to enable the plow to clear said obstruction. and after the plow rides over the obstruction contraction of the spring 80 will bring about a restoration of the frame 20 and the plow or blade member 61 to the positions shown in Figure 1.

Manifestly by turning the wheel 31 the plow or blade member may be conveniently raised or lowered and it will be appreciated that when the wheel 31 is at rest the plow or blade member will be adjustably held at the height desired.

In the practical use of my novel apparatus it will be understood that the edges of the blades 61 will cut incident to each revolution of the plow to the full depth of the furrow or cut with the result that the plowed ground will be completely pulverized, the top soil and the sub-soil will be thoroughly mixed and the grass and weeds in the turf will be completely torn apart so that no turf will be left in the path of the plow.

Notwithstanding the efficiency ascribed to my novel apparatus it will be readily appreciated that the apparatus is simple and inexpensive in construction and at the same time is well adapted to withstand the usage to which ground cutting or working apparatus is ordinarily subjected.

When the apparatus is moved forwardly the gear 10 is engaged with the gear 25 for the rotation of the plow or blade member in the proper direction, and when the apparatus is moved rearwardly the other gear 11 is engaged with the gear 25 for the rotation of the plow or blade member in the reverse direction, and in this connection I would have it understood that irrespective of the direction in which the apparatus is moved the plow or blade member 61 is adapted to operate to advantage. This is particularly advantageous when the apparatus is operating in the corners of fields and other close places.

I have specifically described the preferred embodiment of my invention in order to impart an exact understanding of said embodiment. I do not desire, however, to be understood as confining myself to the structure disclosed, my invention being defined by my appended claims within the scope of which structural changes may be made without departure from my invention.

Having described my invention, what I claim and desire to secure by Letters-Patent, is:—

1. The combination of a motor vehicle having a shaft rotatable by the motor of the vehicle, a beveled gear fixed to said shaft, a vertical swinging frame mounted on a transverse pivot carried by the frame of a vehicle, stop means for limiting forward movement of the lower portion of said swinging frame relative to the vehicle frame, spring means interposed between and connected to the upper portion of said swingable frame, and the rear portion of the motor vehicle, a vertical shaft carried in said swinging frame, a plow carried by the lower portion of said shaft and adapted to be rotated thereby, a beveled gear mounted on said last mentioned shaft and a beveled gear mounted on the transverse pivot and recessed with and connecting the gears on the said shafts.

2. The combination of a motor vehicle having a shaft rotatable by the motor of a vehicle, a vertical swinging frame mounted on a transverse pivot carried by the frame of a vehicle, stop means for limiting forward movement of the lower portion of said swinging frame relative to the vehicle frame, spring means interposed between and connected to the upper portion of said swingable frame and the rear portion of a motor vehicle, a vertical shaft carried in said swinging frame, a beveled gear on the transverse pivot forming operative connection between the first named shaft and the vertical shaft, a plow carried by the lower portion of the second named shaft and adapted to be rotated thereby, the second named shaft being adjusted vertically in the swingable frame and being associated with means for adjusting the vehicle and adjustably maintaining it in working position.

3. The combination of a motor vehicle, having a shaft rotatable by the motor of a vehicle, a vertical swinging frame mounted on a transverse pivot carried by the frame of a vehicle, stop means for limiting forward movement of the lower portion of said swinging frame relative to the vertical frame, spring means interposed between and connected to the upper portion of said swingable frame and the rear portion of the vehicle, a vertical shaft carried in said swingable frame, a beveled gear on the transverse pivot forming operative connection between the first named shaft and the vertical shaft and a plow carried by the lower portion of the second named shaft and adapted to be rotated thereby.

4. The combination of a motor vehicle having a shaft rotatable by its motor, a sleeve mounted to be rotated with and be moved endwise on said shaft, reversely arranged beveled gears fixed on said sleeve and spaced apart, means for adjusting and adjustably fixing said sleeve, a longitudinally swingable frame mounted upon a transverse pivot on the frame of the motor vehicle, an idler gear arranged in said swingable frame and adapted to be engaged by said beveled gears alternately, a retractile spring interposed between and connected to the upper portion of the swingable frame and the rear portion of the motor vehicle, an interiorly threaded nut carried by the upper portion of the swingable frame and having an interior key, an exteriorly threaded sleeve extending through said nut and having a longitudinal keyway receiving said key, an interiorly threaded adjusting wheel swiveled to the swingable frame and receiving and engaging said sleeve, a vertical shaft loosely arranged in said sleeve and in the lower portion of the swingable frame and movable vertically with the sleeve, a beveled gear keyed to said shaft and meshed with said idler gear, and blades fixed to the lower portion of the said shaft.

5. The combination of a motor vehicle having a shaft rotatable by its motor, a sleeve mounted to be rotated with and be moved endwise on said shaft, reversely arranged beveled gears fixed on said sleeve and spaced apart, means for adjusting and adjustably fixing said sleeve, a longitudinally vertically swingable frame upon a transverse pivot on the frame of the motor vehicle, an idler gear arranged in said swingable frame and adapted to be engaged by said beveled gear alternately, a retractile spring interposed between and connected to the upper portion of the swingable frame and the rear portion of the motor vehicle, an interiorly threaded nut carried by the upper portion of the swingable frame and having an interior key, an exteriorly threaded sleeve extending through said nut and having a longitudinal keyway receiving said key, an interiorly threaded adjusting wheel swivelled to the swingable frame and receiving and engaging said sleeve, a vertical shaft loosely arranged in said sleeve and in the lower portion of the swingable frame and movable vertically with the sleeve, a beveled gear keyed to said shaft and meshed with said idler gear, and blades fixed to the lower portion of the said shaft.

6. The combination of a motor vehicle having a shaft arranged to be driven by the motor of a vehicle, a vertical shaft, means forming operative connection between the vertical shaft and the first named shaft, said vertical shaft extending below the frame of the vehicle, and spiral blades carried on the lower portion of said vertical shaft and constituting a rotary plow, the second named shaft and the plow being carried by a longitudinal vertically swingable frame, and the said frame being mounted upon a transverse pivot on the vehicle frame and being associated with stop means for limiting the forward movement of its lower portion and with a retractile spring adapted to yieldingly hold it against said stop means.

7. In combination with a motor vehicle having a shaft rotatable by the motor of the vehicle, a longitudinally vertically swinging frame mounted on a transverse pivot carried by the frame of the vehicle, stop means for limiting the forward movement of the lower portion of said swinging frame relative to the vehicle frame, spring means interposed between and connected to the upper portion of said swingable frame and the rear portion of the motor vehicle, a vertical shaft carried in said swinging frame, means forming operative connection between the vertical shaft and the first named shaft in any position of the former and a plow carried by the lower portion of the second named shaft and adapted to be rotated thereby.

In testimony whereof I affix my signature.

HUGH CARPENTER.